UNITED STATES PATENT OFFICE.

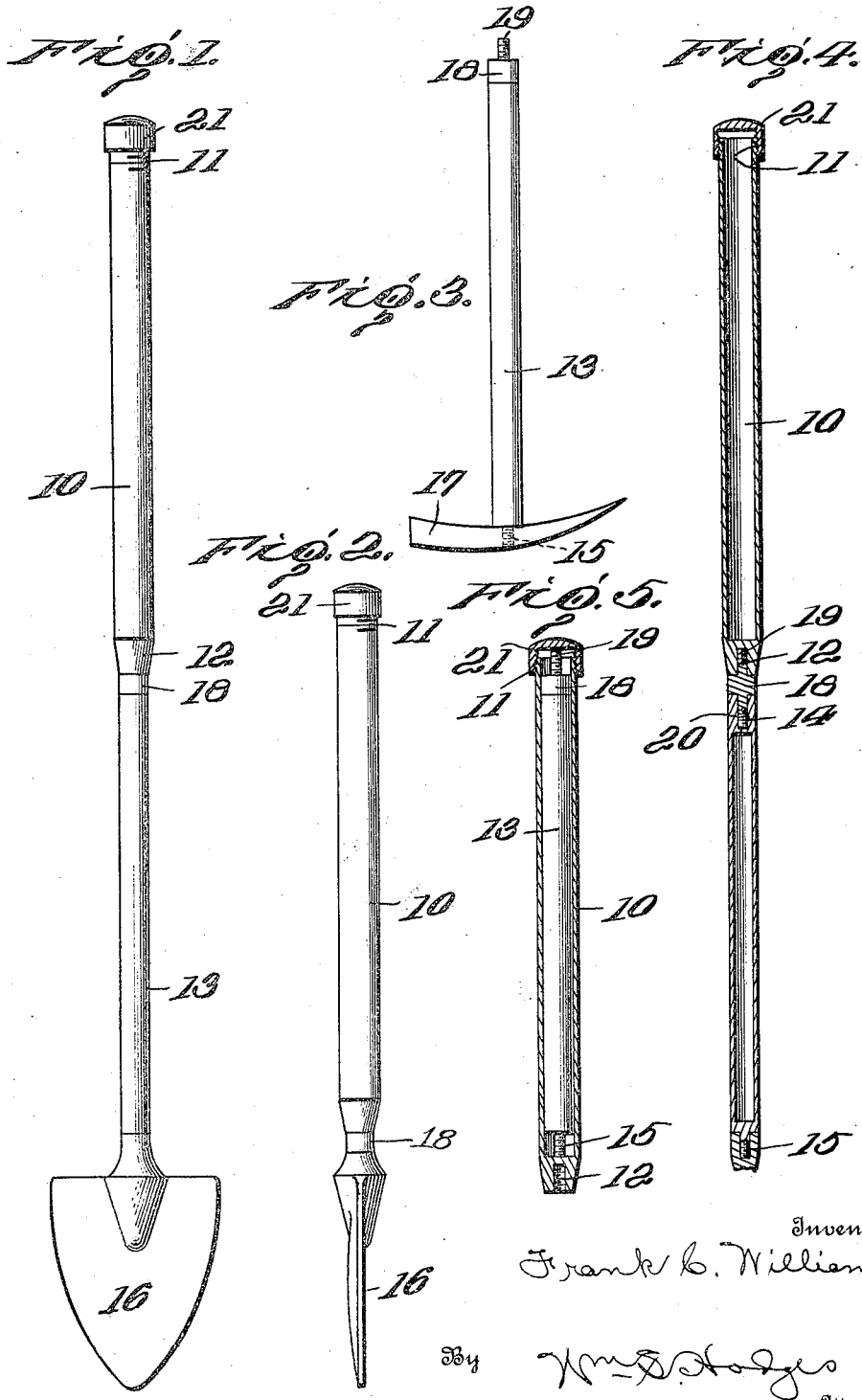

FRANK C. WILLIAMS, OF MONTELLO, NEVADA.

SECTIONAL TOOL.

1,380,090.     Specification of Letters Patent.     Patented May 31, 1921.

Application filed May 27, 1919. Serial No. 300,107.

*To all whom it may concern:*

Be it known that I, FRANK C. WILLIAMS, a citizen of the United States, residing at Montello, in the county of Elko and State of Nevada, have invented a new and useful Sectional Tool, of which the following is a specification.

This invention is a combination tool constructed of elements capable of coöperating to advantage for many purposes.

One of the objects of the invention is to provide a light, strong and durable tool of the sectional type, the parts of which may be readily separated and packed within a small space when not in use. A further object is to provide a sectional handle having means for engagement with tool members of various types and to provide a long or a short handle, as occasion may require. A further object is to provide a tool primarily intended for the use of prospectors, but not limited to such use.

The invention will be hereinafter fully set forth and particularly pointed out in the claims.

In the accompanying drawing:—

Figure 1 is a front view illustrating the invention with a shovel element attached thereto. Fig. 2 is a side view with the shovel element applied to a single section of the handle. Fig. 3 is a similar view illustrating the handle applied to a prospector's hammer. Fig. 4 is a longitudinal sectional view of the handle sections extended and Fig. 5 is a similar view with the handle sections nested.

Referring to the drawing, 10 designates a main handle section preferably constructed of tubular material, such as piping, externally threaded on one end as indicated at 11, the other end being tapered and internally threaded as indicated at 12. The supplemental handle section 13 is also preferably of tubular construction, provided at one end with an internally threaded socket 14, the other end being provided with a threaded tool engaging shank 15, capable of separable engagement with a suitable tool such as a shovel 16, a hammer 17, or the like. A coupling member 18 is provided, the same being formed with threaded shanks 19 and 20 capable of engaging the threaded portions 12 and 14 of the handle sections, said coupling member being provided with shoulders against which the ends of the handle sections abut. The threaded end 11 of the handle section 10 is engaged by a removable cap 21.

In practice, when it is desired to use the tool as a shovel with a long handle, the sections 10 and 13 are united by the coupling member 18, the cap 21 is placed in position, and the shovel member 16 is attached to the shank 15, thereby producing a tool such as illustrated in Fig. 1. Should a shorter handle be desired, the coupling member 18 is utilized to connect the shovel member 16 to the main handle section 10, as illustrated in Fig. 2. In a similar manner the hammer 17 may be attached to the shank 15 of the supplemental section 13, as shown in Fig. 3, or if a longer handle is desired, the hammer 17 may be substituted for the shovel 16 of Fig. 1. It will be understood that while a shovel and a hammer have been specifically described, these tool elements have been selected solely for illustrative purposes, and that various other tools may be employed in the same manner. When the tool is not in use the coupling member is disengaged from the main handle section 10, and after the supplemental section 13 has been disengaged from the tool member, it together with the coupling member 18 is placed inside of the main member 10, and the cap 21 placed in position. The shovel element and the hammer element, together with the nested handle elements may be placed in a bag or other receptacle for convenient storage or transportation.

Having thus explained the nature of the invention and described an operative manner of constructing and using the same, although without attempting to set forth all of the forms in which it may be made, or all of the forms of its use, what is claimed is:—

1. A sectional tool of the character described comprising a tubular handle section open at one end and closed at the other end, a supplemental handle section of a size capable of being stored within the tubular handle section, means whereby one end of said supplemental handle section may be detachably coupled to the closed end of the tubular handle section, a tool having means whereby it may be detachably engaged either with said coupling means or with the other end of the supplemental handle section as desired, and a removable closure for the open end of said tubular handle section.

2. A sectional tool of the character described comprising a tubular handle section open at one end and closed at the other end, a supplemental handle section of a size capable of being stored within the tubular handle section, said supplemental handle section having a socket at one end and a tool-engaging shank at the other end, coupling means whereby the socket end of the supplemental handle section may be detachably engaged with the closed end of said tubular handle section, a tool having means whereby it may be detachably engaged either with said coupling means or with said tool-engaging shank as desired, and a removable closure for the open end of said tubular handle section.

3. A sectional tool of the character described comprising a tubular handle section open at one end and closed at the other end, a supplemental handle section of a size capable of being stored within the tubular handle section, a coupling member having reduced shanks capable of removably engaging complemental portions in the closed end of the tubular handle section and in one end of the supplemental handle section, a tool having means whereby it may be detachably engaged either with a shank of said coupling member or with the other end of the supplemental handle section as desired, and a removable closure for the open end of said tubular handle section.

4. A sectional tool of the character described comprising a tubular handle section open at one end and closed at the other end, a supplemental handle section of a size capable of being stored within the tubular handle section, said supplemental handle section having a socket at one end and a tool-engaging shank at the other end, a coupling member having reduced shanks capable of removably engaging a complemental portion of the closed end of the tubular handle section and the socket end of the supplemental handle section, a tool having means whereby it may be detachably engaged either with a shank of said coupling member or with the tool-engaging shank of the supplemental member, and a removable closure for the open end of said tubular member.

In testimony whereof I have hereunto set my hand.

FRANK C. WILLIAMS.